(12) United States Patent
Broadley et al.

(10) Patent No.: US 9,314,652 B2
(45) Date of Patent: Apr. 19, 2016

(54) HIGH DIRECTIONAL SUPPORT HAVING A CONFIGURABLE NUMBER OF TELESCOPING LEGS

(75) Inventors: Gavin Lee Broadley, Coolum Beach (AU); Michael Klaus Walrond, Redcliffe (AU); Alan Raymond Cambridge, Wooloowin (AU); Bradley Matthew Minnis, Eatons Hill (AU); Scott Andrew West, Boondall (AU)

(73) Assignee: Ferno-Washington, Inc., Wilmington, OH (US)

( * ) Notice: Subject to any disclaimer, the term of this patent is extended or adjusted under 35 U.S.C. 154(b) by 459 days.

(21) Appl. No.: 12/597,596

(22) PCT Filed: Apr. 30, 2008

(86) PCT No.: PCT/US2008/061964
§ 371 (c)(1),
(2), (4) Date: Dec. 2, 2009

(87) PCT Pub. No.: WO2008/134698
PCT Pub. Date: Nov. 6, 2008

(65) Prior Publication Data
US 2010/0102179 A1  Apr. 29, 2010

(30) Foreign Application Priority Data

Apr. 30, 2007  (AU) ................................ 2007902267

(51) Int. Cl.
| F16M 11/38 | (2006.01) |
| A62B 1/06 | (2006.01) |
| B66C 5/02 | (2006.01) |
| F16M 11/32 | (2006.01) |
| F16M 11/34 | (2006.01) |
| F16M 11/26 | (2006.01) |

(52) U.S. Cl.
CPC . *A62B 1/06* (2013.01); *B66C 5/025* (2013.01); *F16M 11/26* (2013.01); *F16M 11/32* (2013.01); *F16M 11/34* (2013.01); *F16M 2200/028* (2013.01); *F16M 2200/08* (2013.01)

(58) Field of Classification Search
USPC .......... 248/558, 150, 151, 159, 165, 166, 168
See application file for complete search history.

(56) References Cited

U.S. PATENT DOCUMENTS

| 769,447 | A | * | 9/1904 | McKinney | 248/188 |
| 965,194 | A | * | 7/1910 | Karbiner | 248/167 |
| 1,164,714 | A | * | 12/1915 | Gronlund | 248/150 |
| 1,276,202 | A | * | 8/1918 | Foster | 248/165 |
| 1,413,710 | A | * | 4/1922 | Dremel | 248/167 |

(Continued)

FOREIGN PATENT DOCUMENTS

GB  385989 A * 12/1932 ................... 248/558

OTHER PUBLICATIONS

Chinese Office Action pertaining to application No. 200880020037.3 dated Oct. 13, 2010.

*Primary Examiner* — Bradley Duckworth
(74) *Attorney, Agent, or Firm* — Dinsmore & Shohl LLP

(57) ABSTRACT

A support in the form of a high directional having a configurable number of telescoping legs is disclosed. The support provides a head and a plurality of telescoping legs, the head having a plurality of head units and each head unit having at least one associated leg depending therefrom. Each head unit being adapted to be coupled to at least two other head units.

28 Claims, 14 Drawing Sheets

(56) References Cited

U.S. PATENT DOCUMENTS

| | | | |
|---|---|---|---|
| 3,313,505 A * | 4/1967 | Petrie | 248/165 |
| 3,779,176 A * | 12/1973 | Piretti | 108/166 |
| 3,863,876 A * | 2/1975 | Finkelstein et al. | 248/188.7 |
| 3,924,890 A * | 12/1975 | Brennan, Jr. | 297/16.1 |
| 4,809,619 A * | 3/1989 | Piretti | 108/115 |
| 5,253,833 A * | 10/1993 | Indou | 248/168 |
| 5,360,194 A * | 11/1994 | Jacobson | 248/431 |
| 5,431,248 A * | 7/1995 | Willaughby | 182/82 |
| 5,460,344 A * | 10/1995 | Malloy | 248/156 |
| 6,161,807 A * | 12/2000 | Steiner et al. | 248/166 |

* cited by examiner

HIGH DIRECTIONAL SUPPORT HAVING A CONFIGURABLE NUMBER OF TELESCOPING LEGS

The present invention relates generally to a rope support, and especially but not exclusively to a support in the form of a high directional having a configurable number of telescoping legs.

High directionals are used as supports for ropes in rescue operations. One known type of high directional comprises a head with a number of fixed-length legs extending therefrom, generally in the form of a tripod, the head supporting a rope guiding element in the form of a pulley or other known embodiment, which can change the direction in which the rope runs. In a typical application a high directional may be used above an opening from which it is desired to retrieve a person. Typically, the legs of the high directional are supported adjacent the opening and the head is supported above the opening. Rope extending off the rope guiding element in a first direction descends generally vertically into the opening and rope extending from the rope guide in a second direction can be pulled to raise the generally vertical portion of the rope, or let out to lower the generally vertical portion of the rope. Thus, using the high directional, the rope can conveniently be used to retrieve a person or object from the opening.

It is against the above background that the present invention provides a support with enhanced flexibility in configuration of a high directional and/or an enhanced capacity for the high directional to be configured to a compact storage configuration when not in use.

One exemplary embodiment of the present invention is a configurable high directional including a plurality of telescoping legs and a head comprising a plurality of head units, wherein each head unit is pivotally attachable with one of the telescoping legs, and each of the head units is releasably coupled with at least one other adjacent head unit.

Another exemplary embodiment of the present invention is a kit for a high directional that includes a plurality of head units and a plurality of telescoping legs. Each head unit being pivotally attachable to both: at least one respective telescoping leg and at least two other head units Another exemplary embodiment of the present invention is a head unit for support, the head unit being such that a plurality of such head units can be connected together to form a head of support having a plurality of telescoping legs. The head unit including an attachment portion for attachment to a telescopic leg of support and a coupling arrangement for connecting to another head unit having a substantially identical coupling arrangement.

Another exemplary embodiment of the present invention is a head unit for support, the head unit being such that a plurality of such head units can be connected together form a head of support. The head having the ability to pivotally attach to a plurality of telescoping legs and a generally central axis. The head unit comprising a first coupling portion and a second coupling portion, each coupling portion being adapted to form a pivotal connection to another head unit such that an axis of rotation of the pivotal connection is generally parallel to the central axis of the head.

Another exemplary embodiment of the present invention is a head unit for support, the head unit being such that a plurality of such head units can be connected together form a head of a support having a plurality of telescoping legs. The head unit comprising a body adapted to receive and be pivotally coupled to a leg, a first coupling portion for connection to another head, and a second coupling portion for a connection to another head unit.

Still another exemplary embodiment of the present invention is a configurable high directional including a plurality of head units and a plurality of telescoping legs, wherein each telescoping leg is pivotally attachable to one of the head units. Each head unit includes a first side connector and a second side connector, wherein the first side connector is adapted to pivotally connect to a second side connector of another head unit and the second side connector is adapted to pivotally connect to a first side connector of another head unit. Each head unit further includes a first head unit element and a second head unit element which are mutually couplable and decouplable at a central point.

These, and other features and advantages of the present invention will become apparent from the following detailed description, and the accompanying drawings.

Embodiments of the invention will now be described, by way of example only, with reference to the accompanying drawings in which.

With reference to FIGS. 1 to 6, an embodiment of a support in accordance with the present invention is in the form of a high directional which is generally designated by symbol 1. The high directional 1 has first, second and third legs 3, 4, 5 each provided with a respective foot 8, 9, 10 attached at a bottom end thereof. In the illustrated embodiment, each respective foot 8, 9, 10 has a flat cleat portion which is ideal for flat surfaces. Vertical lashing holes in the foot are provided for attaching a leg restraint rope (not shown) or other lashing techniques as well as horizontal holes for attaching a hold down stake which is driven into the ground. In other embodiments, each respective foot 8, 9, 10 may be the cleat foot, a pointed spike, a disc shaped shoe for limiting ground penetration in soft ground applications, and combinations thereof.

Figure 1:
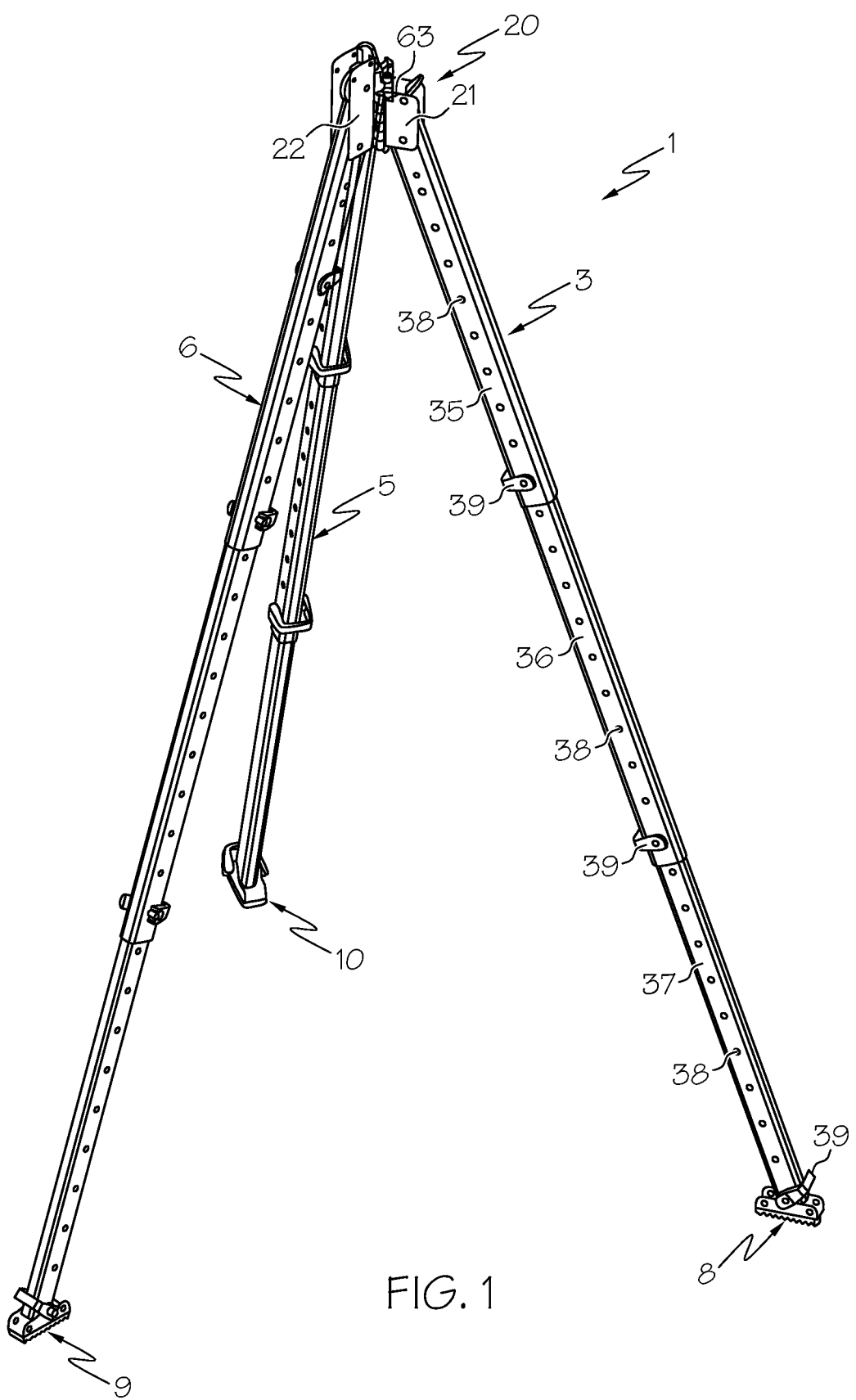
FIG. 1 is a perspective view of an embodiment of a support in the form of a high directional, in accordance with the present invention.

As shown by FIG. 1, the legs 3, 4, 5 are coupled together at the top end thereof by a head 20 of the high directional 1. The head 20 comprises a plurality of head units. The head units are designed such that an appropriate number of head units (for example, but not limited to, two, three, four or five head units) can be selected and connected together in order to form a head 20 which has the desired characteristics, most notably the desired number of legs for a particular rescue operation. In the embodiment illustrated in FIGS. 1 to 3, the head comprises three head units, namely a first head unit 21 associated with the first leg 3, a second head unit 22 associated with the second leg 4 and a third head unit 23 associated with the third leg 5.

Figure 2:
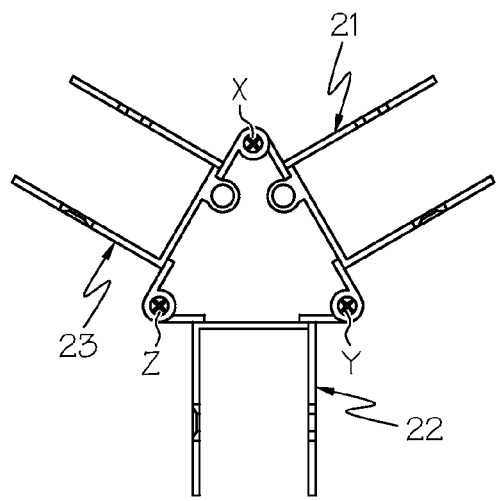
FIG. 2 is a schematic plan view showing the relative positions of three head units which make up the head of the support of FIG. 1.

As illustrated by FIGS. 1 and 2, each of the first to third head units 21, 22, 23 are connected to each of the other head units to form a generally triangular head 20. The connections between the head units 21, 22, 23 will be described in more detail hereafter, but it should be appreciated that the connections enable the head units to pivot relative to each other about axes which are generally vertical in normal use of the high directional 1. In addition, it should be appreciated that description of the connection axes being generally vertical is for illustrative purposes only, and refers to the orientation illustrated in FIG. 1, and that the high directional 1 can be used in a wide variety of orientations. For example the legs can be extended to different lengths or at different angles to accommodate an uneven or non-horizontal surface.

Figure 5:
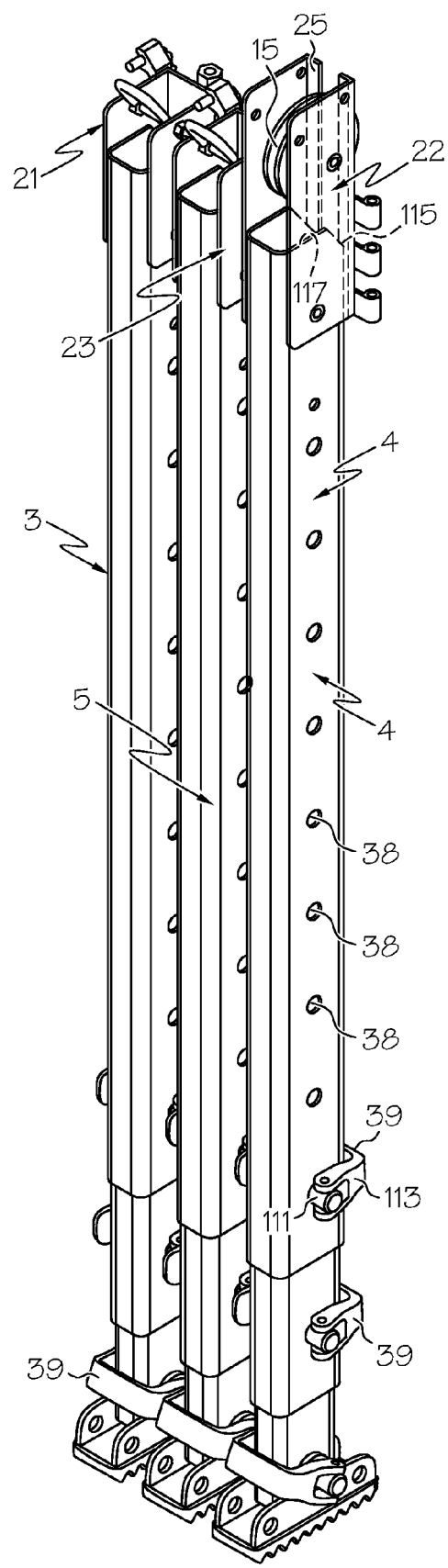
FIG. 5 is a perspective view of the support of FIG. 1 in a storage configuration, of the positions of the head units corresponding to the positions shown schematically in FIG. 4.

As shown in FIGS. 1 and 5, the first to third head units 21, 22, 23 are not identical: the second head unit 22 is different from the first and third head units 21, 23 in that it is provided with a pulley 15 for guiding a rope from a generally vertical direction to a generally horizontal direction, whereas neither of the other head units 21, 23 are provided with a pulley. However, the structure, configuration and function of the coupling portions of the second head unit 22 are substantially identical to the corresponding parts of the first and third head units 21, 22.

Figure 3:
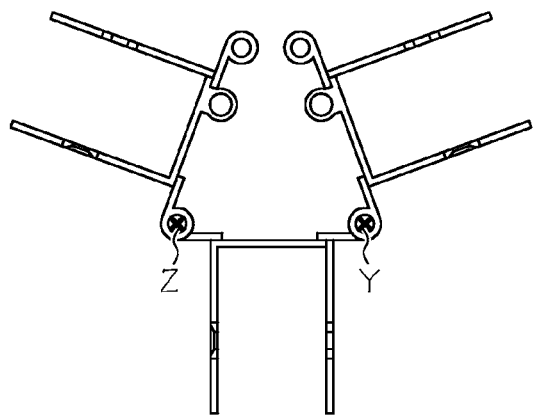
FIG. 3 is a schematic plan view corresponding to FIG. 2 but illustrating an intermediate configuration between a working configuration and a storage configuration.

It will further be appreciated that the head 20 as illustrated in FIG. 1 constitutes the three head members 21, 22, 23 in a triangular configuration, but is somewhat obscured by other elements of the high directional 1. FIGS. 2 and 3 are schematically illustrated for clarity. The head units 21, 22, 23 are, in the working configuration, mutually attached by coupling portions in the form of connectors providing pivotable connections designated by the crosses X, Y and Z. Thus the head 20 is maintained in a triangular working configuration and the head units 21, 22, 23 are unable to pivot relative to each other while all three pivotable connections are maintained.

Figure 4:
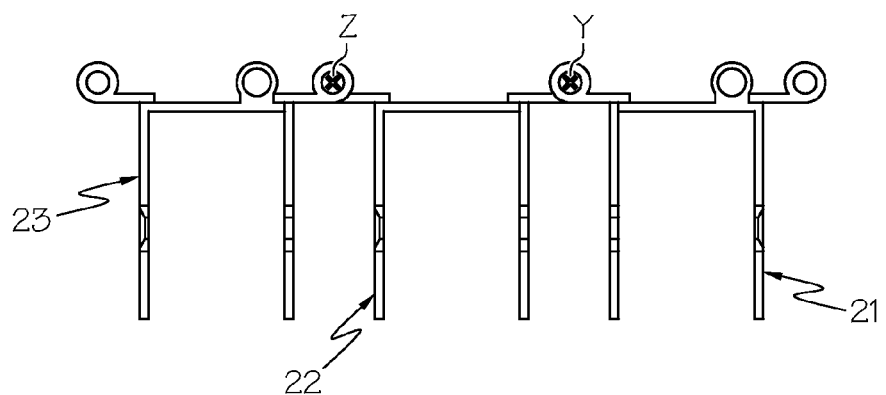
FIG. 4 is a schematic plan view corresponding to FIGS. 2 and 3 but illustrating the relative positions of the head units in a storage configuration.

As illustrated in FIG. 3, if one of the pivotable connections, for example X, is removed the first head unit 21 is disconnected from the third head unit 23, then the head units 21, 22, 23 are able to pivot relative to each other about the remaining pivotal connections Y, Z. This effectively reconfigures the chain of head units from a closed chain to an open chain, and enables the head units 21, 22, 23 to be reconfigured from the triangular working configuration shown in FIG. 2 to a generally linear storage configuration as shown in FIGS. 4 and 5. A single head unit will be illustrated and described in more detail hereafter with particular reference to FIGS. 6a and 6b.

FIG. 5 is a perspective view of the high directional 1 in one possible storage configuration. In the present embodiment three distinct linear storage configurations are possible corresponding to the disconnection of different pivotal connections. For example, as illustrated in FIG. 4, the second head unit 22 is retained in pivotal connection with the first and third head units 21, 23 and is thus at the centre of the linear configuration, whereas as illustrated in FIG. 5, the second head unit 22 is disconnected from the first head unit 21, so that the third head unit 23 is the central head unit of the linear configuration.

Figure 6A:
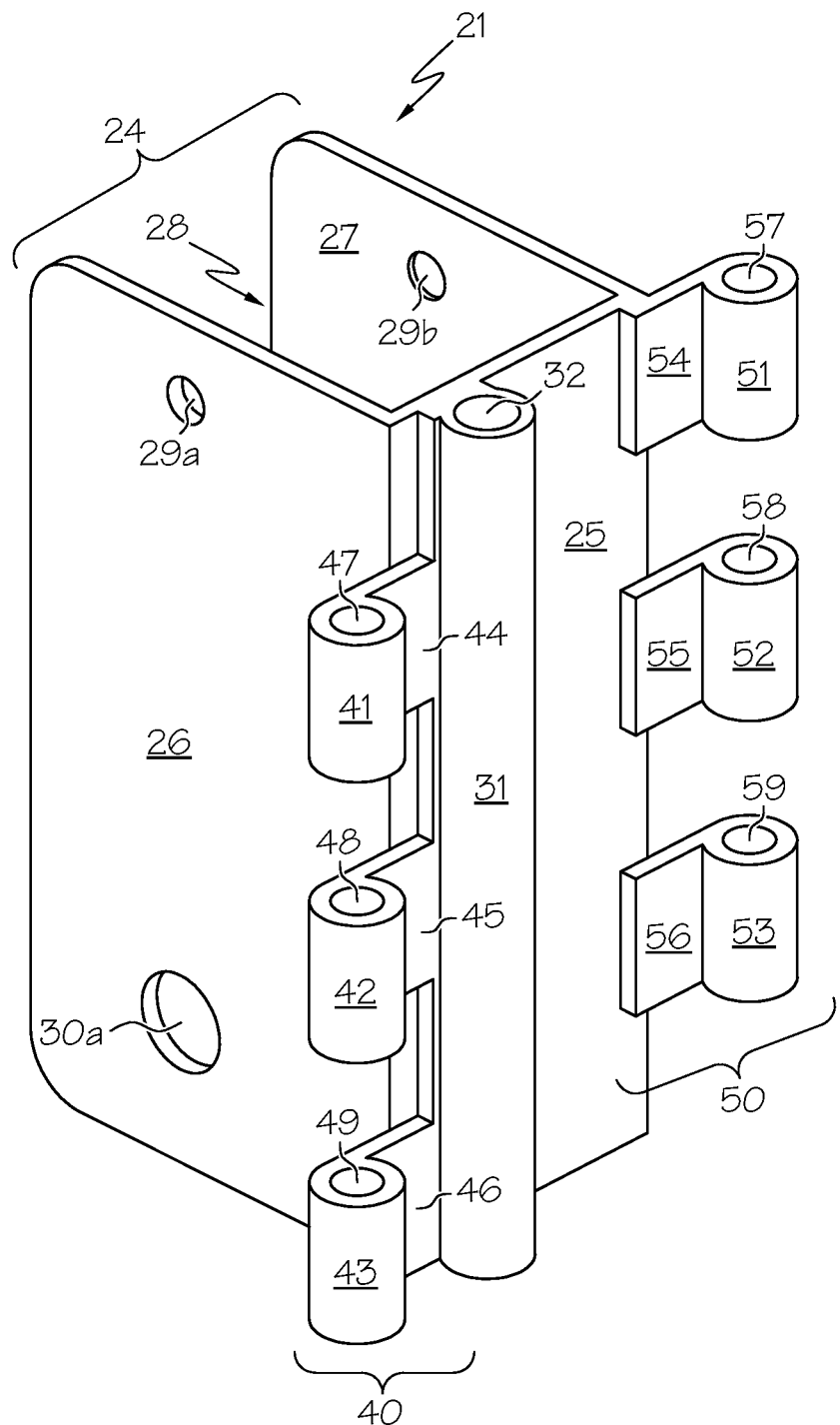
FIGS. 6a and 6b are perspective views of a head unit embodiment, in which FIG. 6b additionally shows a leg and several other components attached thereto.
Figure 6B:
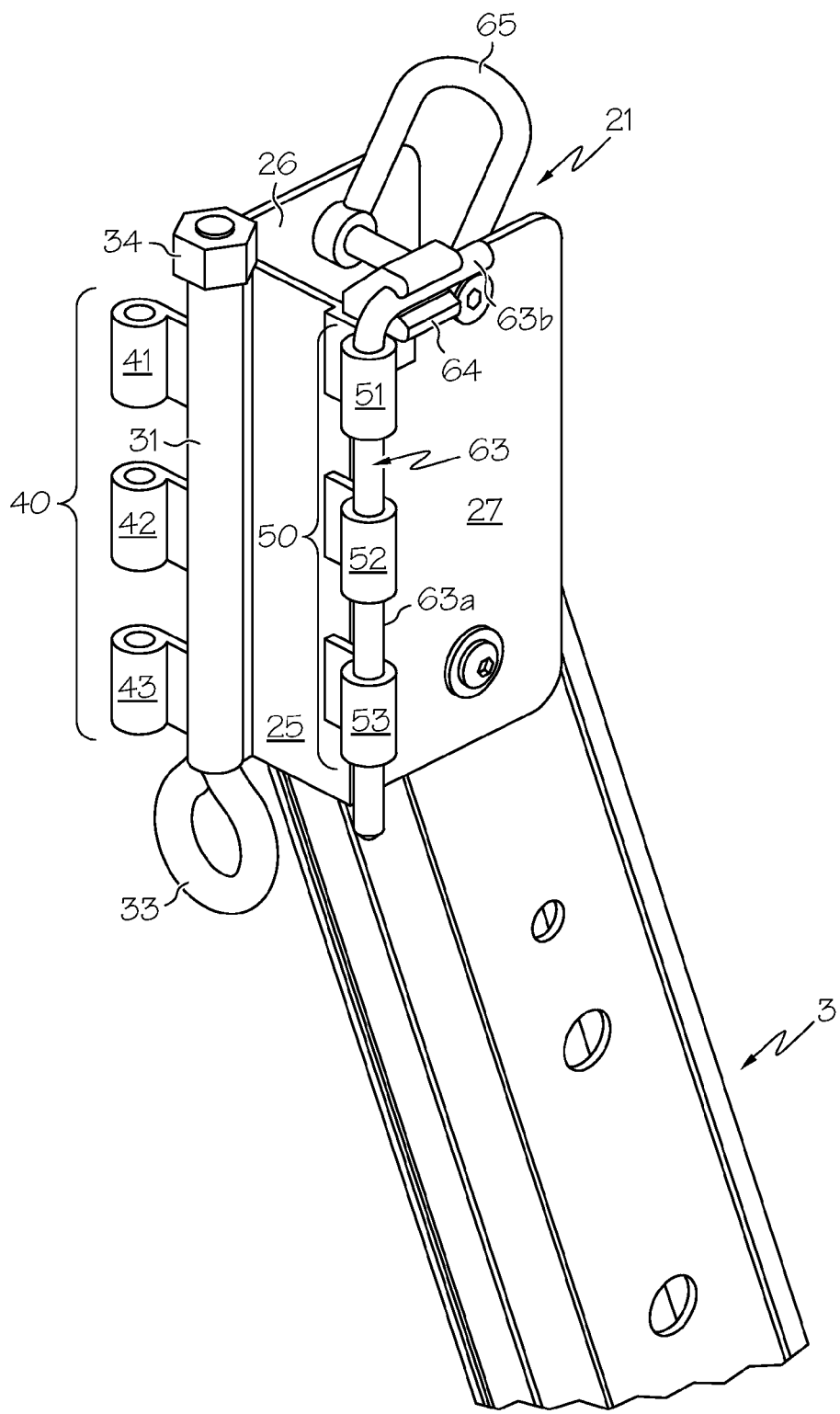

One embodiment of a head unit is illustrated in detail in FIGS. 6a and 6b. In FIG. 6b, the head unit is shown along with a leg 3 and other elements of the high directional 1. One of ordinary skill in the art will appreciate the difference between a head unit without a pulley and a head unit with a pulley, so the later will not be described in detail herein.

As illustrated in FIGS. 6a and 6b, one embodiment of a head unit 21 of the high directional 1, comprises a head unit body 24 with a first side connector 40 provided at one side thereof and a second side connector 50 provided at a second side thereof. The head unit body 24 comprises a generally rectangular front plate 25 and first and second generally rectangular side plates 26, 27 which are mutually parallel and which extend rearwardly generally perpendicular to the front plate 25, from the sides of the front plate 25. First and second aligned accessory apertures 29a, 29b are provided in the first and second side plates 26, 27, respectively close to the tops thereof. An accessory mount 31 in the form of a tubular portion formed integrally with the head unit body 24 is provided on a front surface of the front plate 25.

As best shown by FIG. 6b, in this embodiment the accessory mount 31 provides a through bore 32 suitable for accepting an eye bolt 33 which can be secured in position by a nut 34. In other embodiments, other types of accessory mounts could be provided if desired. In this embodiment the accessory mount 31 is provided asymmetrically on the head unit 21, that is it is closer to the first side connector 40 than to the second side connector 50. Providing the accessory mount 31 asymmetrically on the head unit 21 allows the head 20 to be formed from two head units without the accessory mounts of the two head units obstructing each other.

The first side connector 40 is formed integrally with the head unit body 24 but projects laterally from the front plate 25 so that it extends laterally beyond the first side plate 26. The first side connector 40 comprises first, second and third coaxial tubular portions 41, 42, 43 which are spaced laterally away from the front plate 25 and first side plate 26 by first, second and third connector spacers 44, 45, 46 respectively. In the illustrated embodiment, the third tubular portion 43 extends from the level of the bottom of front plate 25 upwardly approximately one sixth the height of the head unit. The second tubular portion 42 extends between a height two sixths of the way up the head unit to a point halfway up the head unit and the first tubular portion 41 extends from a point two thirds up the height of the head unit 26 to point five sixths up the height of the head unit. The first, second and third tubular portions 41, 42, 43 are examples of respective first, second and third socket portions which provide tubular through bores 47, 48, 49. The tubular portions 41, 42, 43 and through bores 47, 48, 49 are all located further forward than the front plate 25 of the head unit.

The second side connector 50 is similar in many respects to the first side connector 40 but is located on the second side of the head unit 21. The second side connector 50 comprises first, second and third tubular portions 51, 52, 53 offset both laterally to the second side of the front plate 25 and forwardly of the front plate 25 and connected to the front plate 25 by respective first, second and third connector spacers 54, 55, 56. The first, second and third tubular portions 51, 52, 53 of the second side connector 50 provide respective first, second and third through bores 57, 58, 59. The axial lengths of the first, second and third second side tubular portions 51, 52, 53 are the same as the axial length of each of the first side connector tubular portions 41, 42, 43. The elements of the second side connector 50 are offset vertically from the elements of the first connector by a distance equivalent to the axial length of the tubular portions.

Thus, it will be appreciated that the space between each tubular portion 41, 42, 43 of the first side connector 40 is suitable for receiving a tubular portion 51, 52, 53 of a second side connector 50 of an identical head unit so that the six tubular portions 41, 42, 43, 51, 52, 53 are aligned and the corresponding through bores 47, 48, 49, 57, 58, 59 are coaxial. In one embodiment, this corresponds to the spaces between each tubular portion 51, 52, 53 of the second side connector 50 being suitable for receiving a tubular portion of a first side connector 40 of an identical head unit 21 so that the six tubular portions are aligned and the through bores are coaxial. The two identical head units can then be pivotably connected by provision of a suitable locking pin extending through the coaxial through bores of the respective side connectors. In one embodiment, the head units need not be identical in all respects, but it in another embodiment it maybe useful that each head unit is provided with substantially identical coupling arrangements.

A number of head units 21 can thus be selected and connected, and because the tubular portions of the first and second side connectors 40, 50 are effectively vertically offset, the head units themselves need not be vertically offset in order to be connected.
A plurality of head units, substantially identical to the head unit 21 are therefore suitable for forming a chain of head units that can be formed as a closed chain (as illustrated in FIG. 2) corresponding to a working configuration or by disconnection of any two neighboring head units, reconfiguring into an open chain which can be arranged in substantially linear form corresponding to a storage configuration (as illustrated in FIG. 4).

The head unit 21 is provided with the previously mentioned eye bolt 33 which extends through the through bore 32 of the accessory mount 31. Provision of an eye bolt 33 on one or more of the head units which forms a support head is useful for attaching one or more secondary lines, to the head. Secondary lines can be used as safety lines for attaching to the person or object being lowered or retrieved, or could be used to support an additional object such as rescue equipment or an additional person.

Again, as best shown by FIG. 6b, in the second side connector 50 is shown provided with a locking pin 63, in the illustrated embodiment the locking pin has an L-shape, which has a shank portion 63a which passes through the first, second and third tubular portions 51, 52, 53 and a retaining portion 63b perpendicular to the locking portion 63a which is retained in a retaining clip 64 provided at the second side of the head unit 21. It will be appreciated that when the second side connector 50 is connected to a first side connector 40 of a another head unit such as head unit 22 as shown in FIG. 1, the locking pin 63 will extend through the tubular portions of the first side connector of that other head unit in addition to extending through the tubular portions 51, 52, 53 of the second side connector 50. The locking portion 63a of the locking pin 63 is circular in cross-section allowing relative rotation of the second side connector 50 and any first side connector to which it is connected, and thus allowing relative rotation of the connected head units, e.g. head units 21, 22.

The head unit 21 is also provided with a D-shackle 65 which is fastened to the head unit. In this embodiment the D-shackle 65 is fastened between the first and second side plates 26, 27 by a D-shackle pin 66 which extends through both of the accessory apertures 29a, 29b. The D-shackle 65 can extend above the top of the head unit 21 and can be used to assist in guying or otherwise securing the high directional 1, in use, by means of ropes or cables.

In the illustrated embodiments each leg is formed from three lengths of generally rectangular box section which are of slightly different cross sectional sizes so as to provide a telescopic leg. For example, in the illustrated embodiment of FIG. 1 with reference to leg 3, a top leg section 35 is of larger cross sectional size, an intermediate leg section 36 is of intermediate cross sectional size, and a lower leg section 37 is of smaller cross sectional size. Each leg section 35, 36, 37 is provided with spaced apart pairs of opposed aligned bores or apertures 38, and the leg 3 can be varied in length by selecting the appropriate amount of overlap between two leg sections and locking them in position using a locking pin, which in the illustrated embodiment is in the form of a locking pin clip 39. As best shown by FIG. 5, locking pin clip 39 provides a suitably dimensioned pin and retaining portions 111, 113 to retain the pin portion 111 relative to one or more apertures 38 through which the pin 111 extends in use (see also FIG. 10).

A similar locking pin clip 39 can be used to secure the foot 8 to the lower leg section 37. In other embodiments, the leg sections may be secured releasably together by an insertable pin securely held in place by a clip. In addition, if desired, a step(s) (not shown) may be conveniently attached releasably using a pin arrangement through one of the apertures 38, such as to provide a step(s) to the intermediate and/or lower leg sections, which is useful when reaching high rigging.

If desired, in one embodiment one or more of the leg sections 35, 36, 37 could be omitted, and in another embodiment each of the leg sections, such a leg sections 35, 36, 37, is adapted to be attached to a foot and to a head unit, such as foot 8, 9, 10 and head units 21, 22, 23 respectively. Although any suitable material could be used, in one embodiment the leg sections are of aluminum or aluminum alloy. Of course, additional leg sections or leg sections of different lengths could be provided if desired. Although the length and cross section of the leg overall will affect the load bearing capacity of the leg. In alternative embodiments, differently configured telescopic legs or extendible legs of other configurations could be used if desired.

As illustrated by FIG. 5 in a storage configuration each leg 3, 4, 5 is in one embodiment generally coaxial with the channel 28 (FIG. 6a) of each respective the head unit 21, 22, 23. In a working configuration, as illustrated in FIG. 1, each leg 3, 4, 5 is angled outwardly away from the axis of the channel 28 of each respective head unit 21, 22, 23, so that the plurality of legs 3, 4, 5 diverge as they extend away from the head 20 of the high directional 1, in order to allow the feet 8, 9, 10 to be spaced apart to provide stability for the high directional 1. In order to provide a high predetermined maximum angle at which each leg may extend from the respective head unit to avoid undesirable splaying of the legs in use, the top of each leg is provided with angled abutment edges 115. Edge 115 is provided by forming the top end of the leg 4 so that at least part of its end edge 117 is at an predetermined angle to the leg axis, rather than being perpendicular to the leg axis. Thus, leg 4 as well as legs 3, 5 can be rotated only by a predetermined angle about the leg pin before the angled abutment edges 115 abut the rear face of their associated front plate 25, preventing further rotation. The leg pin is situated in the side plate leg pin openings 30a and the upper most leg apertures 38. In other embodiments, legs which are able to be rotated by other predetermined angles shown are of course possible, as are embodiments with some adjustment or locking mechanism so that the rotation angle could be selected by a user.

For example in one embodiment of a high directional 1, one or more of the legs may be adapted to be rotatable by at least 90 degrees, to provide an easel leg arrangement. In another embodiment such a leg is substantially freely rotatable about its connection to the associated head unit, and is best adapted to abutment against a surface which is oriented in a direction with a substantial vertical component. Under such circumstances the easel leg can provide useful stable support to the support head despite being freely rotatable relative to its associated head unit. Additionally, the easel leg, and/or the foot associated with the easel leg, might be tied to the object it is supported on and/or to one or more of the other legs. This can enhance the ability of a freely rotatable easel leg to provide useful stable support. Of course, if desired, an easel leg could be provided with a locking mechanism for locking it against rotation at any of a selected number of angles. Alternatively, or additionally, the easel leg could, if desired, be provided with one or more abutment edges on a rearward part of its exposed end edge in order to limit rotation.

Figure 7:
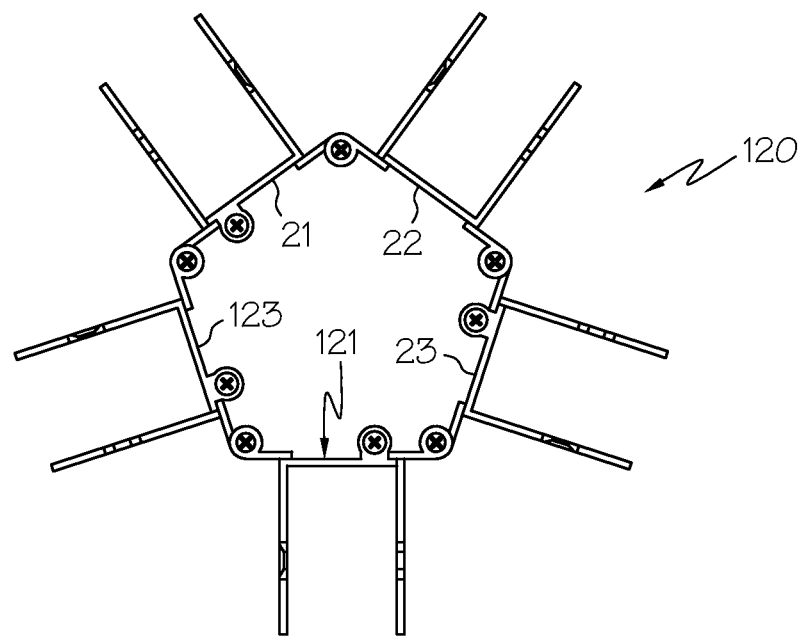
FIGS. 7 and 8 show an embodiment of an alternatively configured support which includes five legs and five head units, and otherwise correspond generally to FIGS. 1 to 5.
Figure 8:
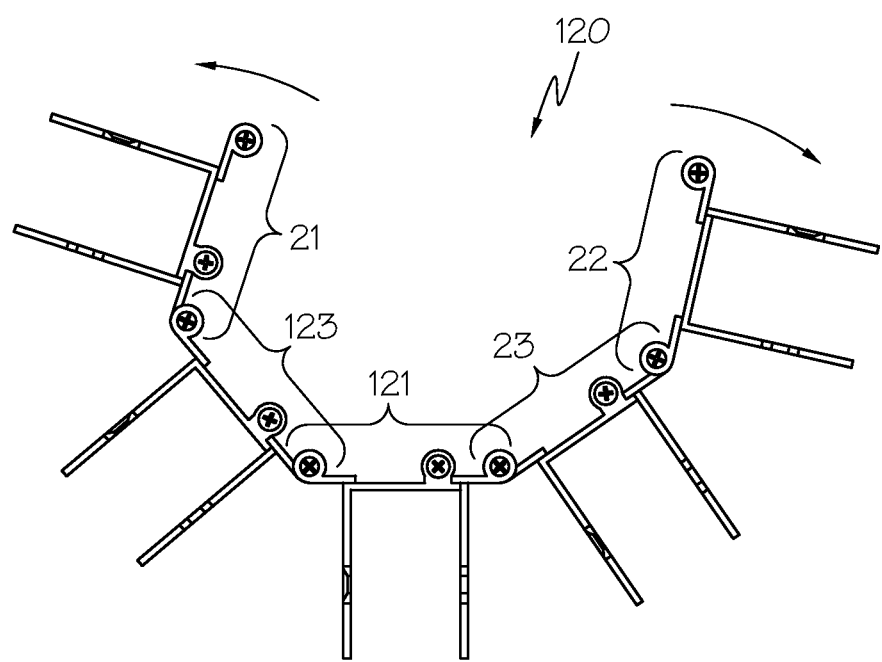

From the foregoing description it will be evident that the described embodiments of the head 20 can provide a three legged high directional 1 which can be easily assembled and which can be conveniently reconfigured to a storage configuration while leaving the three head units 21, 22, 23 connected to each other. However, it should also be appreciated that if a high directional 1 with more legs is required, for example for greater load bearing capacity, additional head units with legs can be easily connected into the chain of head units, in order to meet such a requirement. For example, FIGS. 7 and 8 represent a head 120 of a high directional, which includes the first to third head units 21, 22, 23 of the high directional 1, and also includes fourth and fifth head units 121, 123. Head units 121, 123 as illustrated, are identical to the first and third head units 21, 23.

It will be appreciated that because of the additional degrees of freedom in closed chains which have more than three links, as against a three-link closed chain, embodiments in which the head units form a head with a polygonal shape with more than three sides, such as head 120, a mechanism to maintain the desired head shape and rigidity is used. Any suitable mechanism could be used. For example, the head 120 could be provided with adjustable cams or other abutment means so that the abutment means could be set so that each head unit 21, 22, 23, 121, 123 would abut the neighboring heads units so that the front plates of neighboring head units are aligned at one of a predetermined angles, the angles corresponding to the internal angle of a regular polygon with a number of sides corresponding to the number of head units (i.e. ninety degrees for a head comprising four head units, 108 degrees for a head comprising five head units, 120 degrees for a head comprising six head units, etc). However, one mechanism to maintain the desired head shape and rigidity comprises use of one or more "shape keepers" each in the form of a brace which braces a fixed point on a head unit with a fixed point on at least one of the other head units.

Examples of such braces will be described in due course with reference to FIGS. 9 to 12.

Figure 9:
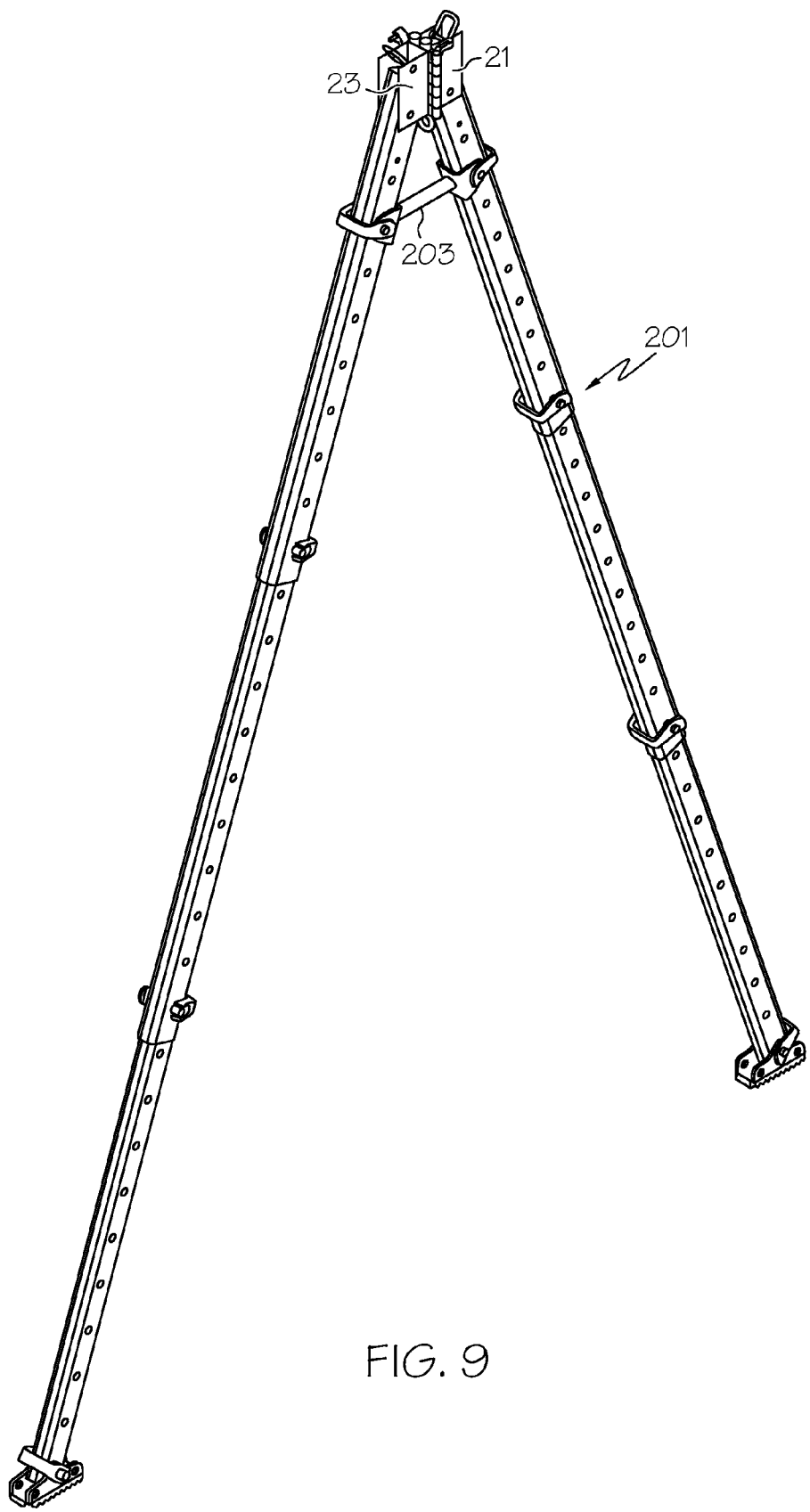
FIG. 9 is a perspective view of an embodiment of an alternatively configured support which has two legs and further includes a brace between the two legs.

FIG. 9 illustrates a support in the form of a bi-pod or A-frame 201, which is formed from only the first and third head units 21, 23 and first and third legs 3, 5 of the high directional 1. It will be appreciated that the first side connector 40 of the first head unit 21 connects to the second side connector of the third head unit 23, and the second side connector 50 of the first head unit 21 connects to the first side connector of the third head unit 23, so that this configuration can be considered a closed chain of two head units. As illustrated, a tie bar 203 may be provided to tie the legs together which can provide extra strength and allow the angle between the legs 3,5 to be controlled.

Figure 10:
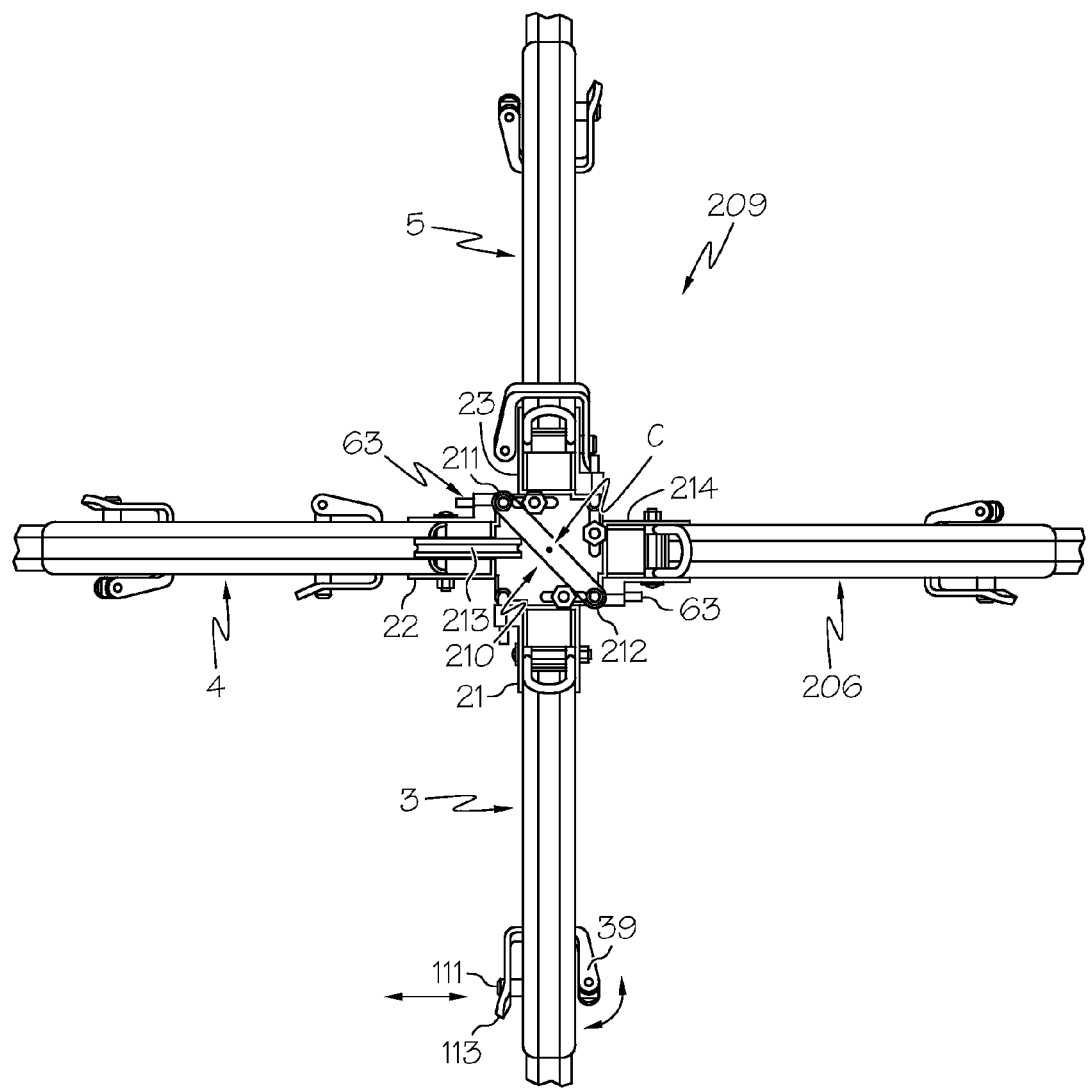
FIG. 10 is a plan view of part of a support embodiment which includes four legs and four head units, and a mechanism for keeping a head in the desired shape.

FIG. 10 is a plan view of part of a high directional 209 which includes four legs 3, 4, 5, 206 and four head units 21, 22, 23, 214 and a mechanism for keeping the head in the desired shape, which for a support with four head units is normally a square. In this embodiment of FIG. 10, the mechanism for keeping the head in the desired shape comprises a simple brace 210 which can for example be made from plate steel a few millimeters thick, and which is provided with first-end and second-end apertures 211, 212 which are adapted to be engaged by the L-shaped locking pins 63 which connect the head units together by having the locking pins pass therethrough. The use of brace 210 does not impede the functioning of locking pins as previously described. The brace 210 is adapted to extend across a diagonal of the four-sided square head, and effectively to space apart two diagonally opposite corners of the head. It will be appreciated that the first-end and second-end apertures 211, 212 must be spaced a predetermined distance apart and that for a head in which the head units form a square, this distance will be approximately 1.41 (square root of two) times the distance between the centers of the first and second side connectors of any one of the head units. Use of the brace 210 effectively separates the closed polygonal chain of head units into two triangles, ensuring that the shape can be maintained despite the pivotal nature of the connections between the head units.

Figure 11:
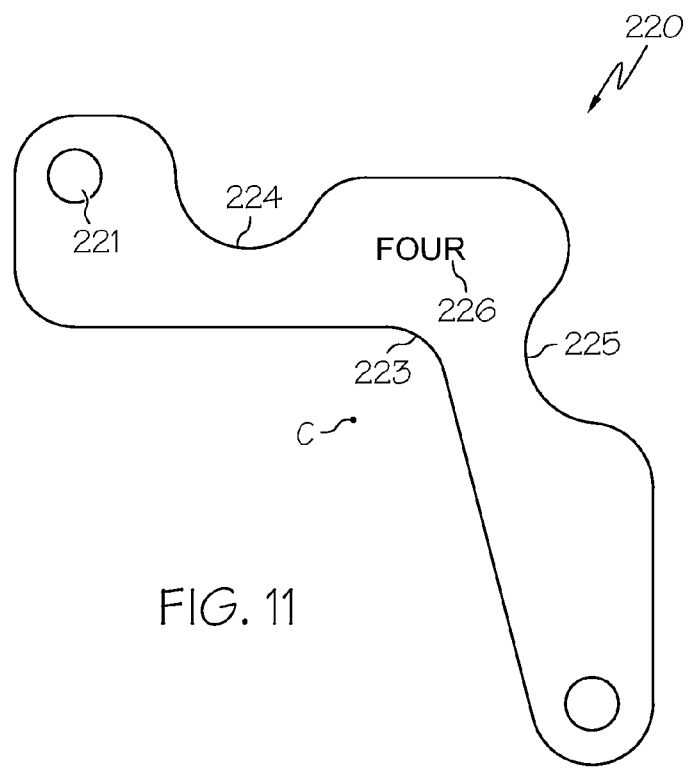
FIG. 11 is a plain view of an embodiment of an alternative embodiment of a mechanism for keeping a head comprising four head units in the desired shape.

Although simple, effective and economical to produce, a brace in the form of a simple straight element might, such as brace 210 under some circumstances, may be problematic in use, as it might obstruct a rope descending from the rope guide or pulley. FIG. 11 displays a plain view of an alternative embodiment of a mechanism for keeping the head in the desired shape, which comprises a bracing plate 220. The bracing plate 220 is provided with first-end and second-end apertures 221, 222 and works analogously to the simple brace 210 but is shaped to minimize the risk of interference with a rope supported by the high directional 209 by provision of a main recess 223. In the illustrated embodiment the entire bracing plate 220 may be regarded as being generally L-shaped or generally crescent shaped and the main recess 223 is provided by the inside corner region or inside curve of this shape. Of course, any suitable shape providing a recess or other void where the rope might otherwise be contacted could be used. Because the bracing plate 220 is shaped to provide a void at or close to the center C of the head, such as head 209, it extends close to the periphery of the head, and is therefore provided with secondary recesses 224, 225 to avoid obstruction by parts of the head. In particular, in the illustrated embodiment, the secondary recesses 224, 225 accommodate the nuts 34 of the eyebolts 33. The bracing plate 220 is provided with indicia 226, which in this case is the word FOUR, to indicate the number of head units in the head for which it is intended to be used.

Figure 12:
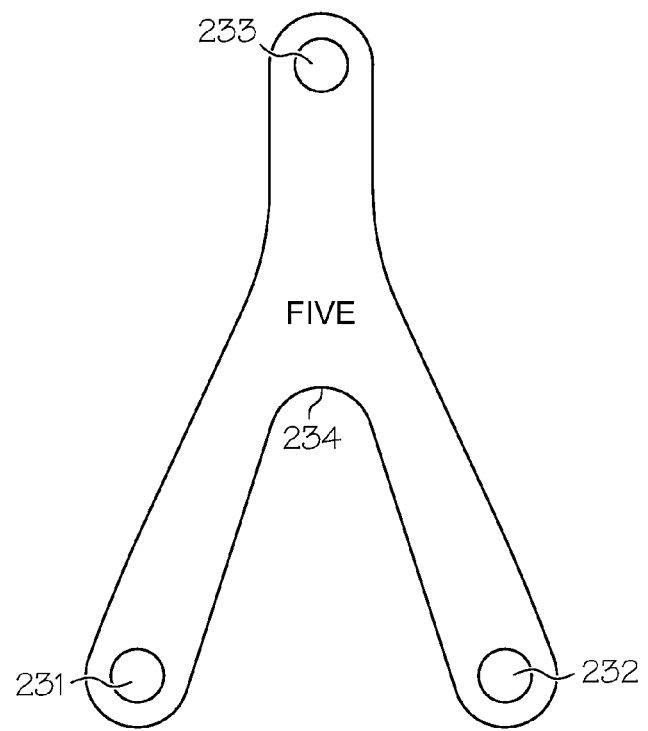
FIG. 12 is a plan view of a shape keeper embodiment which is part of the mechanism for keeping a head comprising five head units in the desired shape.

FIG. 12 displays a plain view of bracing plate 230, an alternative embodiment of a mechanism for keeping the head comprising five head units in the desired shape (which for a support with five head units is normally a regular pentagon). It will be appreciated that the bracing plate 230 works analogously to the bracing plate 220, but that since it is for a support with five head units it provides three apertures 231, 232, 233 for effectively spacing apart three pivotable connections which are at vertices of the pentagonal head so that the polygonal shape is effectively divided into non-deformable triangles, in use. The bracing plate 230 is generally Y-shaped in form with the apertures 231, 232, 233 at the end of the limbs of the Y. The apertures are thus arrayed as an isosceles triangle and the bracing plate 230 is adapted to brace the first third and fifth vertices of the pentagonal head. The bracing plate 230 also provides a main recess 234 for providing a void where the rope might otherwise be contacted, and indicia 235, which in this case is the word FIVE, to indicate the number of head units for which it is intended to be used.

It will be appreciated that alternative shapes of bracing plates (or other bracing members) could be used and that bracing plates (or other bracing members) could be provided for heads comprising six (or more) head units. Bracing members having a generally central portion with a number of arms radiating outwardly therefrom could be used, although it might be useful to offset the "center" of the bracing member from the center C of the head in order to provide a void through which a line, such as a rope, could pass without obstruction. Generally circumferentially extending bracing members with suitably positioned apertures could be used (see for example the general construction of the connection/bracing plates in FIG. 16). Such circumferentially extending bracing members could have a large central void, such as, for example void 355 of FIG. 16, for a line to pass through, and additionally or alternatively could provide a discontinuity or gap in their periphery to provide a void and to reduce the likelihood of obstruction of the rope or other elements of the support.

Figure 13:
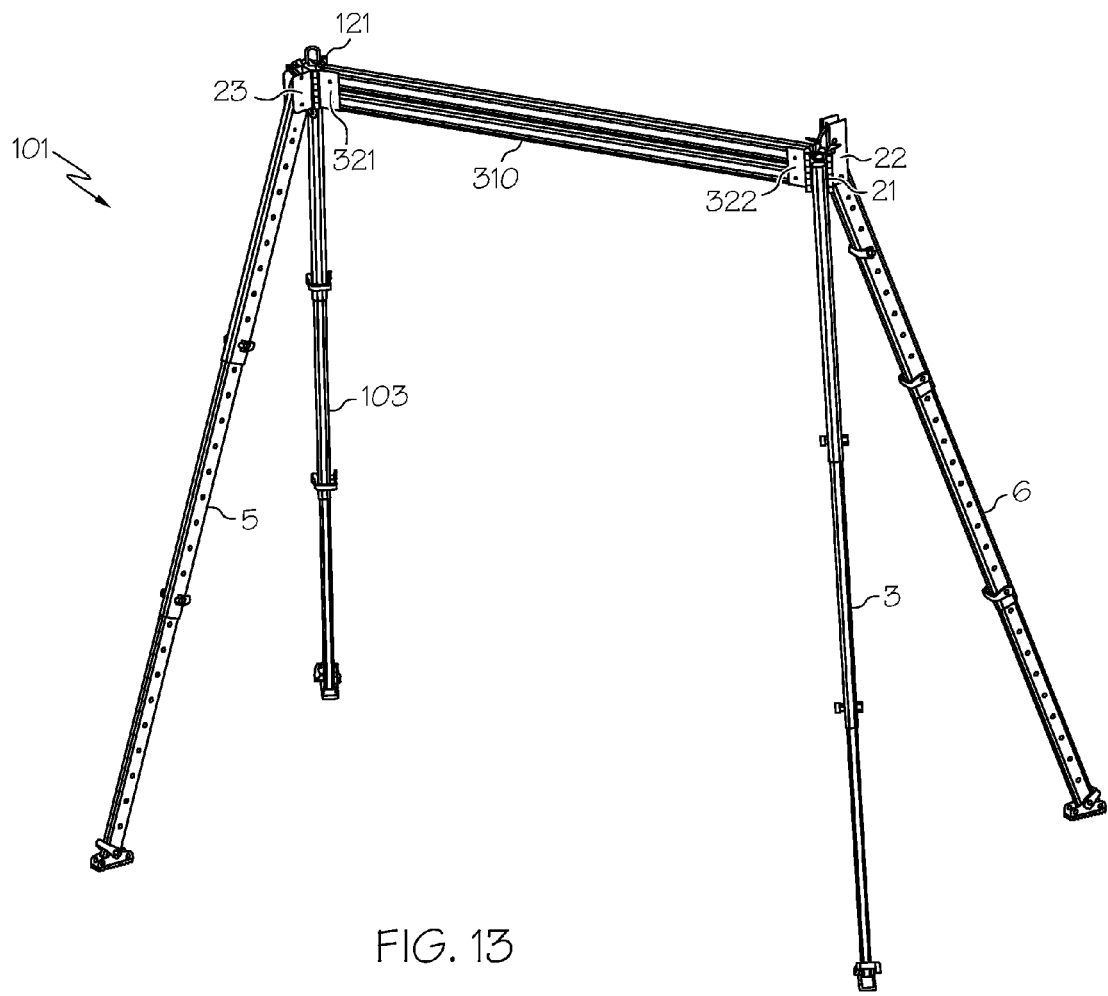
FIG. 13 is a perspective view of an embodiment of a support having two pairs of head units spaced apart by a bridge member.

FIG. 13 is a perspective view of a high directional 101 comprising a substantially rigid elongate bridge member 310 supported in a substantially horizontal orientation. A first end of the bridge member 310 is supported by first and second head units 21, 22 and associated pivotally attached telescoping legs 3, 4, and a second end of the bridge member 310 is supported by third and fourth head units 23, 121 and pivotally attached telescoping legs 5, 103. The bridge member 310 is provided with connectors 321, 322 at either end thereof, and the connectors are substantially identical to those provided on the head units 21, 22, 23, 121 so that each can be easily connected to two head units in the same way as a third head unit could be connected.

The bridge member 310 may be useful in providing a high directional that is required to extend across a large opening or hole. In one embodiment, the bridge member may be provided with a trolley (not shown) that can be hauled back and forth along the bridge member 310 using a positioning line, such as used, for example and not limited thereto, as part of an English Reeve rigging system. In such a trolley embodiment, the connectors 321, 322 are provided with integral pulleys provided below the connection with the bridge member 310. In one embodiment, one of the connectors 321, 322 is provided with two vertical pulleys, and the other with a horizontal (i.e. sideways) pulley in order to accommodate the English Reeve rigging. It is to be appreciated that the pulleys provided on the connectors 321, 322 in another embodiment may conventionally positioned above the bridge member 310 by simple flipping the connectors over before being connected to heads 21, 22, and 23, 121, and beam 310.

Bridge members of any desired length could be provided although load-bearing capacity will decline as the length increases. Lengths of one meter and two meters may be provided as standard equipment in a kit also comprising four head units and corresponding legs. In other embodiments a shorter bridge member 310 could be used in order to provide a compact four-legged high directional 101 without use of a special shape keeper or brace member as described above. As one further alternate embodiment, a connection member comprising, effectively, two front plates 25 and associated connectors 40, 50 (FIG. 6a) configured back to back could be used to connect two pairs of head units 21, 22 in order to provide a compact four-legged high directional without use of an additional brace or shape keeper.

Figure 14:
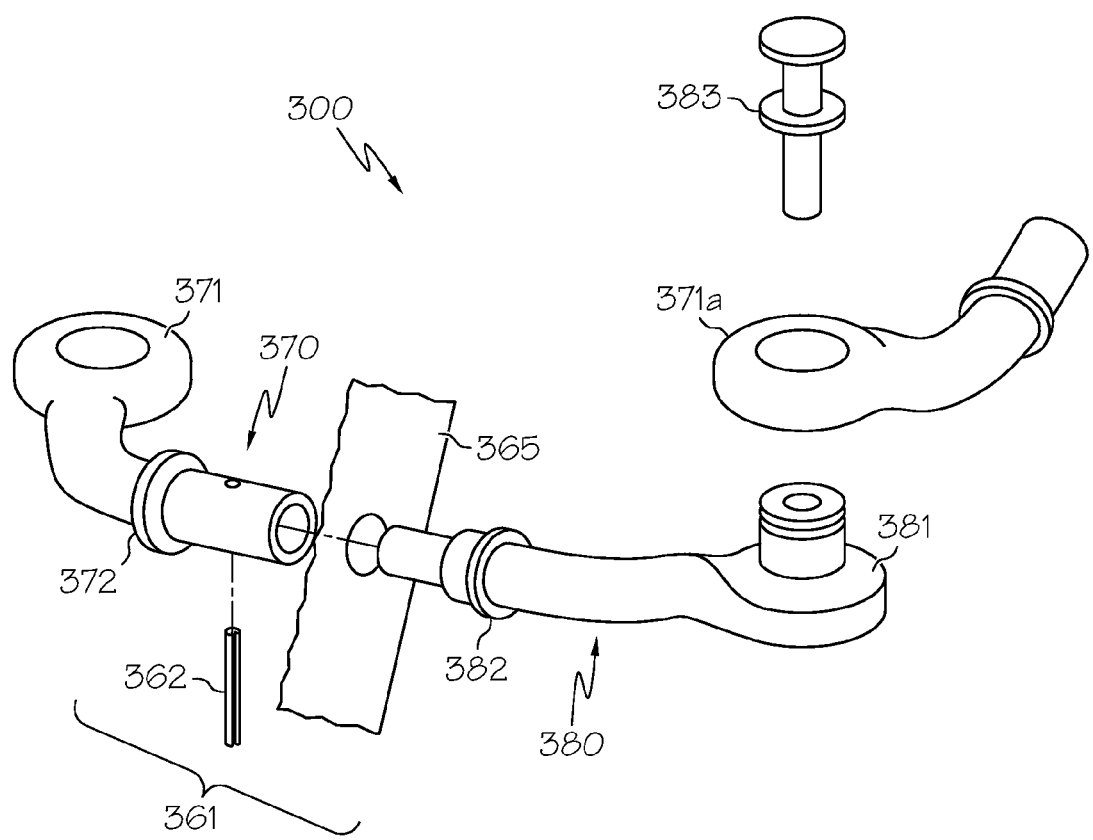
FIG. 14 is a perspective view illustrating parts of a further alternative embodiment according to the present invention.
Figure 15:
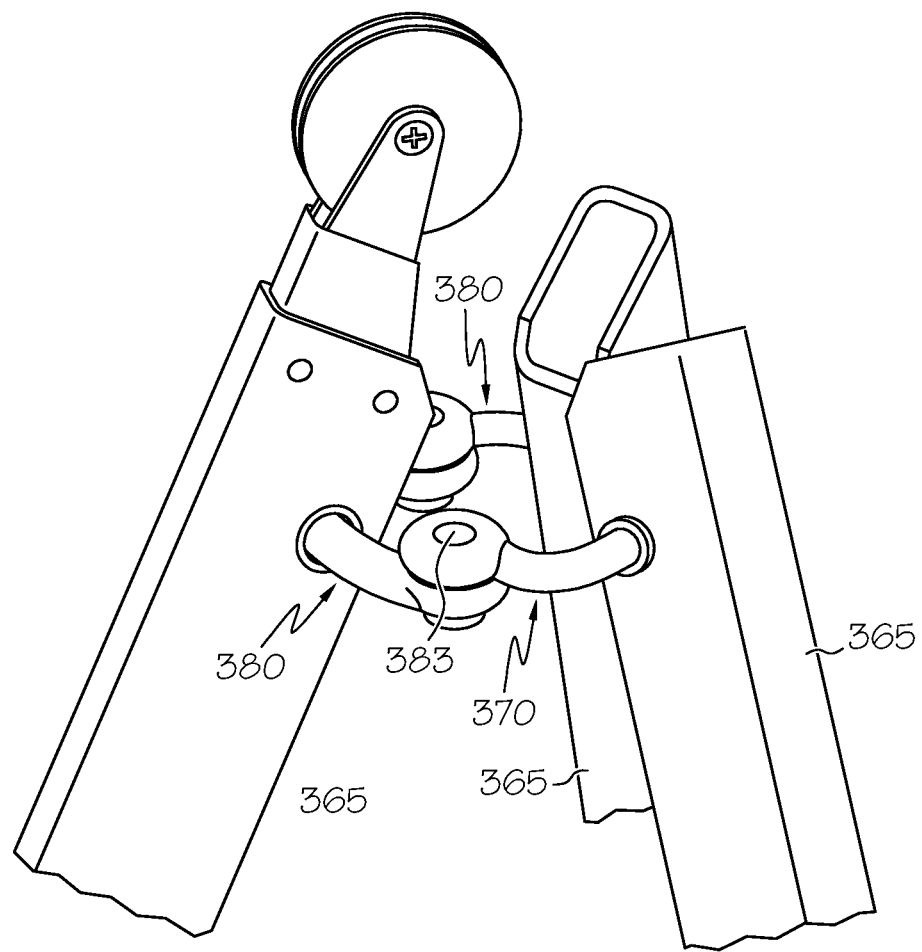
FIG. 15 is a perspective schematic illustration of an upper part of a support embodiment formed using the parts illustrated in FIG. 14.

FIGS. 14 and 15 illustrate schematically an alternative embodiment to the present invention. In this embodiment each head unit 300 comprises a generally cylindrical central portion 361 which is adapted to fit within a leg 365 (partially shown in FIG. 14) and about which the leg can pivot. Each head unit 300 further comprises a first side connector 371 at a first side thereof and a second side connector 381 at a second side thereof. The first side connector 371 of each head unit 300 is adapted to pivotally connect to the second side connector 381 of any of the other head units via a pin 383 (where second side connector 38, pivotally connects to first side connector 371a of another head unit). Each head unit is divisible into a first head unit element 370 and a second head unit element 380 which are mutually couplable and decouplable at the central portion 361. The first and second head unit elements 370, 380 are thus mutually connectable, by inserting the central portion 361 part of each head unit element into an opposed side of a leg 365, and coupling the first and second head unit elements 370, for example by using a rolled spring pin 362 through aligned radial bores (not shown) in the central portion 361 parts to form a complete head unit 300 coupled to the associated leg 365.

Each head unit element 370, 380 is provided with a flange 372, 382 to prevent lateral movement of the central portion 361 relative to the associated leg 365 in use.

Each side connector 371, 381 extends laterally beyond the associated leg, allowing a chain of a selected number of head units and legs to be formed. Each side connector 371, 381 also extends forward of the associated leg allowing two head units to be connected to form a bipod. Although not illustrated in the schematic drawings, the angular movement of the legs 365 around the central portions 361 may be restricted by any suitable mechanism, including providing bracing between the legs (perhaps in the form of one or more chains, ropes or cables that connect lower parts of the legs); providing abutment portions at or adjacent the tops of the legs so that the abutment portions abut each other and each obstructs rotation of the others; contouring the apertures in the legs and the central portions 361 of the head units so that instead of being circular/cylindrical they interact to allow only a predetermined angular range of relative movement; or a combination of two or more of the above.

Figure 16:
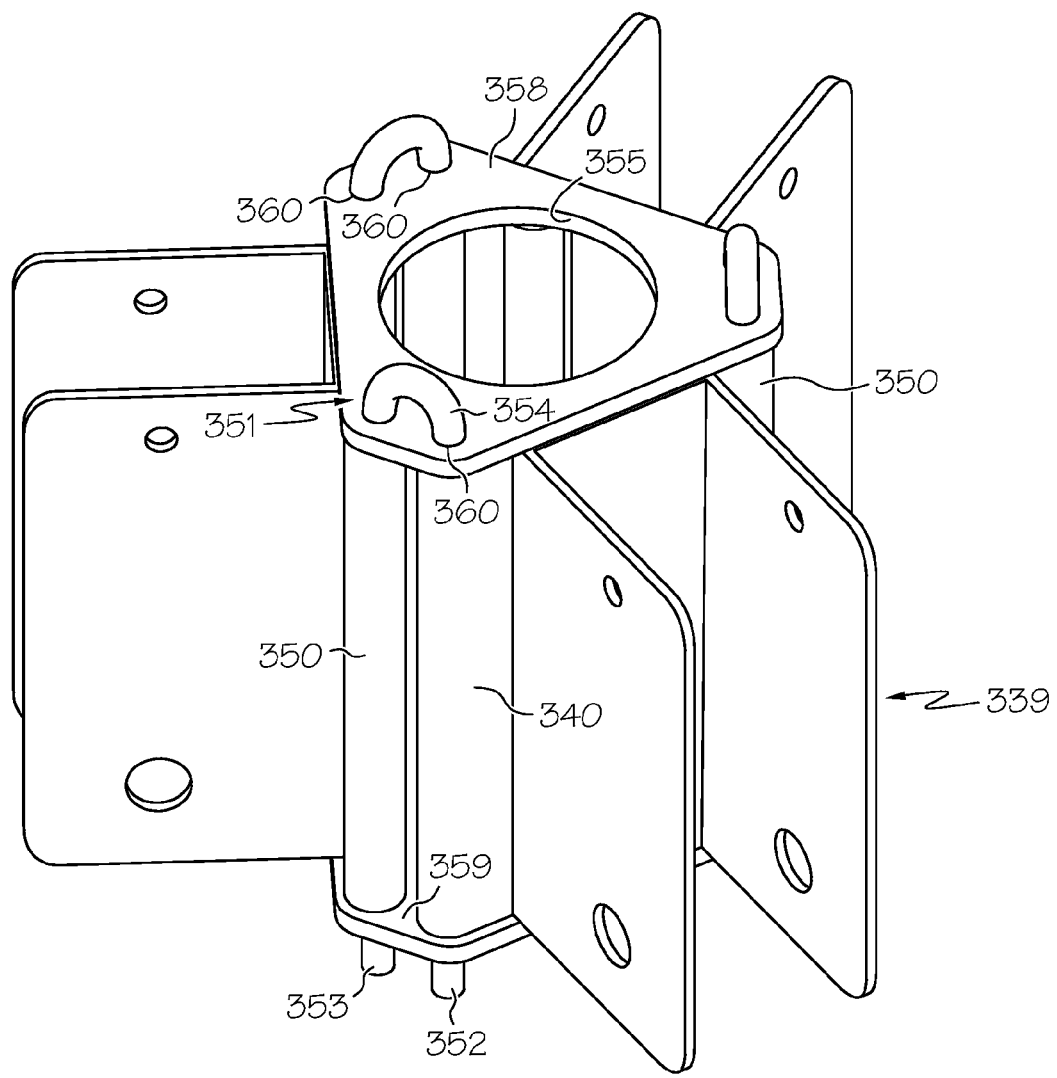
FIG. 16 is a perspective view of an alternative embodiment of a head comprising three head units.

Another further alternative is illustrated schematically in FIG. 16. In this embodiment the head units 339 are similar to the head units 21, 22, 23 of FIGS. 1 to 3, except that the side connectors 340, 350 are formed as continuous tubes extending substantially the entire height of the head unit 339, rather than as a plurality of spaced apart tube portions. This means that the side connectors 340, 350 of neighboring head units cannot be interlocked and connected coaxially (assuming that the said neighboring head units are to be at the same height). The side connectors 340, 350 of neighboring head units are, instead connected by generally U-shaped connecting pins 351. Each generally U-shaped connecting pin has two elongate limbs 352, 353, and a connection portion 354 joining respective proximal ends of the elongate limbs 352, 353.

In order to pivotally connect two head units, one elongate limb 352 of a U-shaped connecting pin 351 extends through the first side connector 340 of one head unit and the other elongate limb 353 extends through the second side connector 350 of the other head unit. However, this means that each head unit is pivotally connected to each neighboring head unit via two parallel pivotal axes, meaning that even with a three head unit configuration a mechanism for keeping the head in the desired shape is used. In the embodiment shown by FIG. 16, the mechanism for keeping the head's shape is provided by upper and lower connection/bracing plates 358, 359, each of which has an aperture 360 for each limb of each U-shaped connecting pin 351, and a large central aperture or void 355 which provides a void for a line to pass through substantially without obstruction. In another embodiment, additional elements may be provided to help retain them relative to the side connectors 340, 350. For example fasteners (not shown) attached to the distal ends of the elongate limbs 352, 353 of the U-shaped connecting pins 351.

Figure 17:
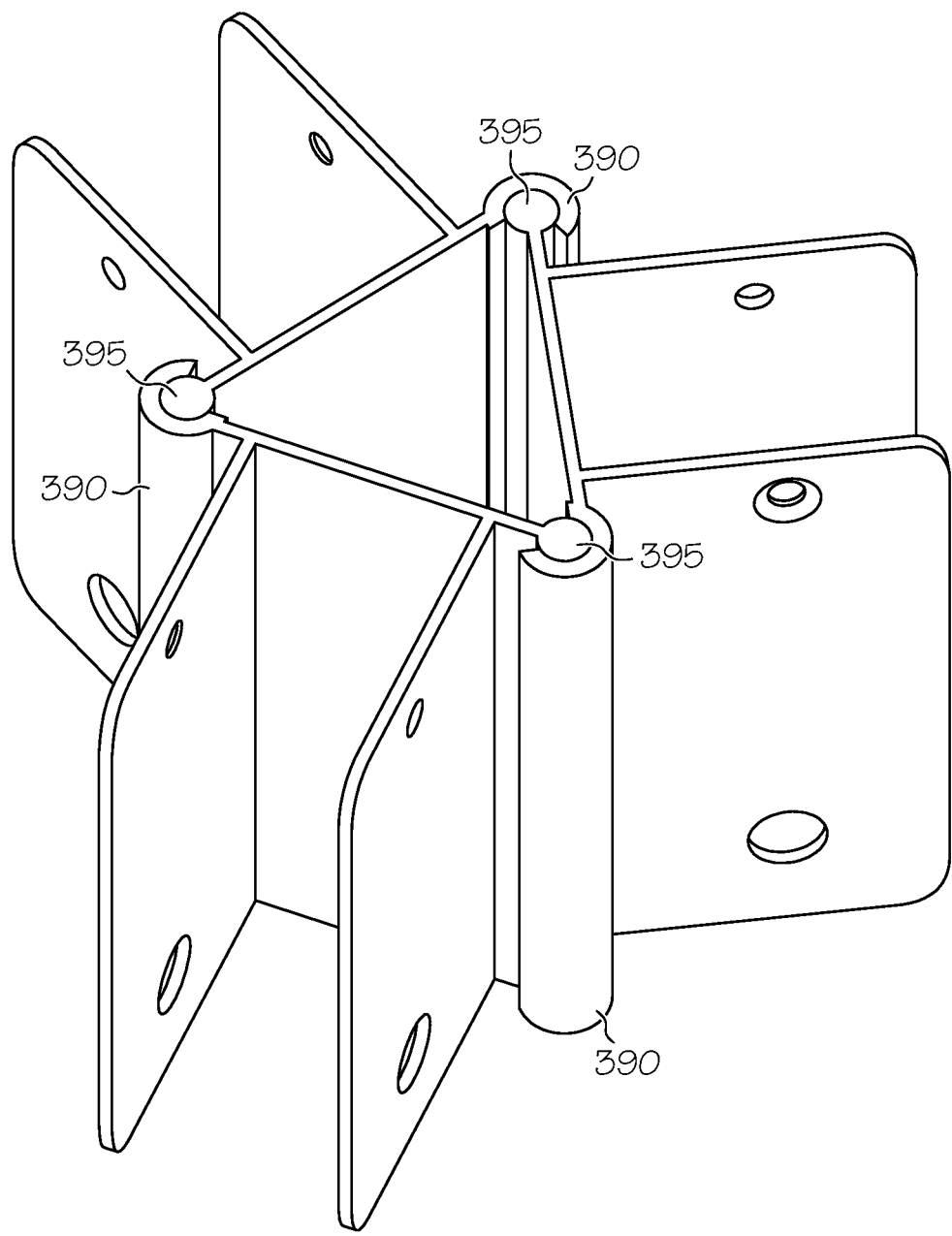
FIG. 17 a schematic perspective view of a further alternative embodiment of a head comprising three head units.

FIG. 17 illustrates schematically a further alternative embodiment. In this embodiment the head units are similar to the head units 21, 22, 23 of FIGS. 1 to 3, except that each first side connector is formed as a part cylindrical tubular sheath 390 and each second connector is formed as a generally cylindrical rod member 395. The rod member 395 adapted to slide axially into tubular sheath 390 to form a pivotable connection there between. The angular extent of the opening 394 is adequate to allow considerable pivotal freedom between neighboring head units. Thus it will be appreciated that a number of head units can be selected according to the number of legs desired. In another embodiment additional elements are provided. For example, an embodiment which relative axial movement of the first and second side connectors are restricted, the cylindrical rod members 395 extend upwardly and downwardly beyond the part cylindrical tubular sheaths 390. In addition ends of the cylindrical rod members 395 are threaded so that the first and second side connectors are then restricted by applying complementary nuts to the threaded rod portions. Fasteners other than threaded fasters still in other embodiments could be used, and of course, there are many other variations which could be implemented.

It will be appreciated that many other variations which fall with the scope of one or more aspects of the invention are possible. In one variation each head unit could be provided with a hinge between a connector and a head unit body, and the connector could connect to a complementary connector of another head unit in a non-rotatable manner. This would still allow relative pivoting of the connected head units, and could still therefore be regarded as a pivotal connection between the head units. It is further to be appreciated that the present invention may be rigged as a Gin pole (mono pole using a Gin head connected on top of a leg), an A-frame (bipod), sideways A-frame, tripod, quad pod, lazy leg or ease leg tripod, handrail monopod, a bridge, five legged frame, and the likes.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. A configurable high directional support comprising:
   a plurality of telescoping legs wherein the top of each telescoping leg is provided with an angled abutment edge;
   a head comprising a plurality of head units each having on opposite sides thereof first and second side connectors, wherein each head unit is pivotally attached to a respective one of the plurality of telescoping legs, wherein the telescoping legs are located in a respective head unit channel, and wherein each of the head units is adapted to be coupled to two other head units via the first and second side connectors to form a chain of head units, and wherein
   each head unit is releasably coupled with at least one other adjacent head unit.

2. The high directional support according to claim 1 wherein each of the head units is pivotally and releasably coupled to two adjacent head units.

3. The high directional support according to claim 1, wherein one of the plurality of head units further comprises an attachment element for attachment of a rope guiding element.

4. The high directional support according to claim 1, wherein one of the plurality of head units further comprises an attachment element for attachment of a rope guiding element, wherein the rope guiding element comprises a pulley.

5. The high directional support according to claim 1, wherein the plurality of head units connected sequentially to form an open chain of head units, wherein each of the head units is pivotally and releasably coupled to an adjacent head unit.

6. The high directional support according to claim 1, wherein the plurality of head units connected sequentially to form a closed chain of head units, wherein each of the head units is pivotally and releasably coupled to two adjacent head units.

7. The high directional support according to claim 1, wherein the plurality of head units connected sequentially to form a closed chain of head units, wherein the closed chain can be arranged to form an array in the form of a regular polygon, and wherein each of the head units is pivotally and releasably coupled to two adjacent head units.

8. The high directional support according to claim 1, the plurality of head units connected sequentially to form a closed chain of head units, wherein the closed chain can be arranged to form an array in the form of a regular polygon comprising the shapes of a triangle, a square, a pentagon, a hexagon, a heptagon, an octagon, an enneagon, or a decagon, and wherein each of the head units is pivotally and releasably coupled to two adjacent head units.

9. The high directional support according to claim 1, further comprising a bracing member adapted to connect to and mutually brace four coupled head units.

10. The high directional support according to claim 1, further comprising a bracing member adapted to connect to and mutually brace five coupled head units.

11. The high directional support according to claim 1, further comprising a bracing member adapted to connect to and mutually brace three coupled head units.

12. The high directional support according to claim 1, further comprising a bracing member adapted to connect to and mutually brace at least two telescoping legs.

13. The high directional support according to claim 1, wherein each head unit further comprises a body portion, wherein the body portion has attachment means which releasably attach the respective one of the plurality of telescoping legs.

14. The high directional support according to claim 1, further comprising a bridge member adapted to connect to and mutually brace at least two pairs of coupled head units.

15. The high directional support according to claim 1, wherein the respective telescoping leg is adapted to pivot around the head unit by at least 90 degrees.

16. The high directional support according to claim 1, further comprising a pin, wherein the first side connector is adapted to be coupled to a respective side connector of an adjacent head unit, and the first side connector and the respective side connector form together a hinge which is held together via the pin.

17. The high directional support according to claim 1, further comprising a pin, wherein the second side connector is adapted to be coupled to a respective side connector of an adjacent head unit, and the second side connector and the respective side connector form together a hinge which is held together via the pin.

18. The high directional support according to claim 1, further comprising a pair of pins, wherein the first side connector is adapted to be coupled to a respective side connector of an adjacent head unit, and the first side connector and the respective side connector form together a hinge which is held together via one of the pair of pins, and the second side connector is adapted to be coupled to another respective side connector of another adjacent head unit, and the second side connector and the other respective side connector form together a hinge which is held together via the other one of the pair of pins.

19. The high directional support according to claim 1, further comprising a pin and a respective retaining clip provided to a side of each head unit, wherein the first side connector is adapted to be coupled to a respective side connector of an adjacent head unit, and the first side connector and the respective side connector form together a hinge which is held together via the pin, and wherein the pin is held releasably in place by the respective retaining clip.

20. The high directional support according to claim 1, further comprising at least one bracing member which spaces one of the head units a predetermined distance from another one of the head units.

21. The high directional support according to claim 1, further comprising a pair of pins and at least one bracing member which spaces one of the head units a predetermined distance from another one of the head units, wherein the first side connector is adapted to be coupled to a respective side connector of an adjacent head unit, and the first side connector and the respective side connector form together a hinge which is held together via one of the pair of pins, and the second side connector is adapted to be coupled to another respective side connector of another adjacent head unit, and the second side connector and the other respective side connector form together a hinge which is held together via the other one of the pair of pins, and wherein the bracing member is engaged by one of the pair of pins.

22. The high directional support according to claim 1, wherein the first and second side connectors define two rotational axes for coupled head units, wherein the two rotational axes are parallel to each other.

23. The high directional support according to claim 1, wherein each head unit is pivotally attached to a respective one of the plurality of telescoping legs with a leg pin through a leg pin opening on opposite sides of the head unit and through one or more leg apertures.

24. A kit for a high directional support having a head and a plurality of telescoping legs, comprising:
a plurality of head units each having on opposite sides thereof first and second side connectors;
a plurality of telescoping legs each having an angular abutment edge provided at the top thereof;
each head unit being pivotally attachable to a respective one of the plurality of
telescoping legs wherein the telescoping legs are located in a respective head unit channel; and
each head unit being pivotally couplable to two other head units only via the first and second side connectors to form a chain of head units.

25. The kit according to claim 24 wherein at least one head unit is equipped with a pulley.

26. The kit according to claim 24 further comprising a bracing member to retain the head units in a desired configuration.

27. A configurable high directional support comprising:
a plurality of head units;
a plurality of telescoping legs, wherein each telescoping leg is pivotally attachable to one of the head units, wherein the telescoping legs are located in a respective head unit channel, and wherein the top of each telescoping leg is provided with an angled abutment edge;
each head unit further comprises a first side connector and a second side connector, wherein each of the head units is adapted to be coupled to two other head units only via the first and second side connectors to form a chain of head units, wherein the first side connector is adapted to pivotally connect to a second side connector of one of the head units and the second side connector is adapted to pivotally connect to a first side connector of another one of the head units; and
each head unit further comprises a first head unit element and a second head unit element which are mutually couplable and decoupable at a central portion.

28. A configurable high directional support comprising:
a plurality of telescoping legs wherein the top of each telescoping leg is provided with an angled abutment edge;
a head comprising a plurality of head units each having on opposite sides thereof first and second side connectors, wherein each head unit is pivotally attached to a respective one of the plurality of telescoping legs, wherein the telescoping legs are located in a respective head unit channel, and wherein each of the head units is adapted to be coupled to two other head units via the first and second side connectors with a pin for coupling the head units via the first and second side connectors to form a chain of head units, and wherein
each head unit is releasably coupled with at least one other adjacent head unit.

* * * * *